April 1, 1969   J. F. WALDORFF   3,435,616
EQUALIZING SYSTEM FOR HYDRAULIC MOTORS
Filed Feb. 28, 1967

United States Patent Office 3,435,616
Patented Apr. 1, 1969

3,435,616
EQUALIZING SYSTEM FOR HYDRAULIC MOTORS
Jorgen F. Waldorff, Nordborg, Denmark, assignor to Danfoss A/S, Nordborg, Denmark, a company of Denmark
Filed Feb. 28, 1967, Ser. No. 619,368
Claims priority, application Germany, Mar. 1, 1966,
D 49,466
Int. Cl. F01b 25/04; F01k 23/00; F02b 73/00
U.S. Cl. 60—97          3 Claims

ABSTRACT OF THE DISCLOSURE

A pressure equalizing system for use with series hydraulic motors connectable to the motors sensing pressure variations across the motors and effective to maintain the pressure drops across series hydraulic motors constant in spite of external conditions and changing operating conditions so that the desired motor speeds and power ratios are maintained. The system uses opposed pistons as valve means opening and closing a fluid bypass for bypassing hydraulic fluid between series motor effective to maintain the pressure hydraulic fluid flow between the motors uniform and effective to maintain the pressure drops across the motors constant and uniform.

---

This invention relates generally to hydraulic motors and more particularly to a new and improved hydraulic pressure equalizing system.

There are many hydraulic motor arrangements in which it is desirable that the motors operate with identical speeds, torques and power outputs regardless of changes in the environment or external factors or conditions affecting the individual motors. Moreover, hydraulic motors in motor arrangements should be capable of opeating at different speeds, torques and with different power conditions. An example of this is a series hydraulic motor arrangement for vehicles having a hydraulic motor drive for each of the wheels. It can be seen that when such a vehicle is travelling straight there will be generally no problem with respect to the motors maintaining similar operating conditions, however, as the vehicle makes a turn the wheels will be travelling at different speeds and in order to maintain the motors operating at desired speeds and torques as well as power outputs provision must be made for such differences in operation.

Furthermore, achievement of uniform speeds for series motors presents a problem since sometimes hydraulic fluid leakages occur or vary among the motors in a given series arrangement. Furthermore, the position of a particular hydraulic motor within a series arrangement may tend to cause it to opeate differently than the other motors as well as the inaccuracies of manufacture causing variations in operating conditions. For example, in hydraulic motors provided with the usual oil leakage drains the motors to which maximum pressure is applied normally have the greatest hydraulic fluid leakage losses. Thus under such leakage conditions within a given series arrangement the hydraulic motors would be operating under different conditions or pressure drops across the motors. Furthermore the problem is complicated by a requirement of the motors operating under different conditions, i.e. where hydraulic motors are expected to temporarily operate in different modes only in dependence upon external operating conditions.

It is a principal object of the present invention to provide a new and improved hydraulic pressure equalizing system for series hydraulic motor arrangements in which the hydaulic motors may operate in one direction or are reversible and operate in two opposite directions.

A feature of the present invention is provision of equalizing means within the system provided with a bypass and capable of sensing and responding to variations in pressure changes and differences in the pressure drops across paired series hydraulic motors. The system is provided with opposed pistons responsive to hydraulic fluid pressure changes and operate in a balanced condition when the motors are operating with the same pressure drops across the individual motors. The pistons are unbalanced when the pressure drops across the paired motors differ and will open the bypass to bypass pressure fluid across one of the paired motors to maintain constant and uniform the pressure drops across the motors thereby to maintain them operating at substantially constant and uniform speeds, torques and power outputs.

The system according to the invention is capable of bypassing sufficient fluid bridging a motor slowed due to its operating conditions, for example the inner wheel of a vehicle travelling around a curve and preventing the other motors from maintaining their speed, to maintain uniform pressure drops across the motor as far as possible. The effect of the equalizing system according to the invention is similar to that of a mechanical differential gear.

Another feature of the invention is the provision of bypass ducts or channels that have an opening or orifice having a throttle effect on the hydraulic fluid bypassed such that the speed different possible between motors is limited to a predetermined value. This value can be set by means of the throttle or orifice resistance and may be set for low operating speed differences, for example ten (10) revolutions per minute. The system thus has the effect of a differential lock comparable to differential locks in differential gears. The differential lock prevents the appearance of an operating condition in which a motor which does not encounter any resistance races at high speeds whereas the other motors under load stop and cease to deliver any output at all.

Still another feature of the invention is the provision of a change-over switch by means of which the motors can be made to operate in series or in parallel in conjunction with the same hydraulic pressure equalizing system with the equalizing system rendered ineffective in the parallel mode of operation.

Other features and advantages of the hydraulic pressure equalizing system in accordance with the invention will be better understood as described in the following specification, claims and appended drawings in which:

Figure 1:
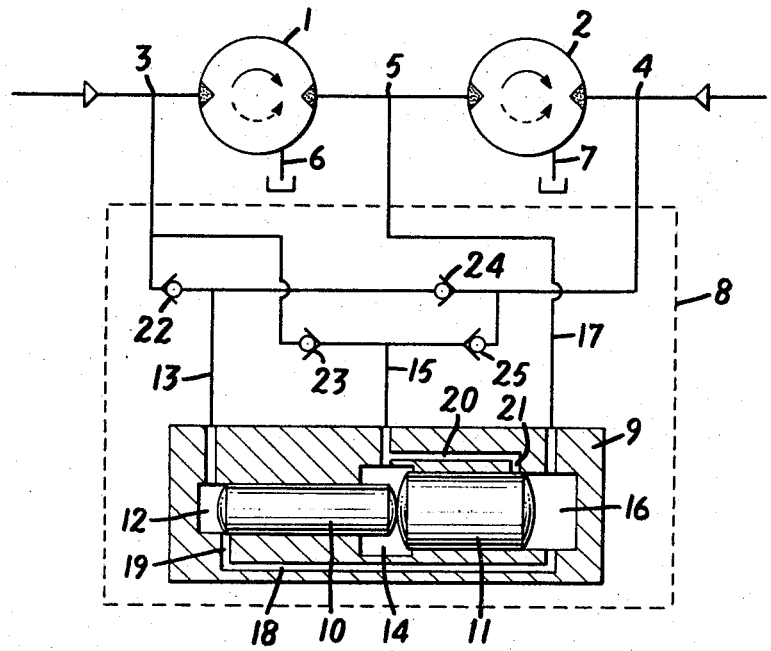
FIG. 1 is a schematic diagram of series hydraulic motors provided with a pressure equalizing system in accordance with the invention.

As illustrated in FIG. 1 of the drawing, alike, reversible hydraulic motors 1 and 2 are series connected. The hydraulic motors are connected by pipe lines shown as single lines for introduction of pressure fluid at point 3 from a pressure source, not shown, and discharge at point 4 for return to the pressure source, for example. As hereinafter explained the motors may be operated by introduction of pressure fluid at point 4 and discharge at point 3 and the arrows in the supply lines terminating in arrow heads at the motors indicate delivery is possible from either direction. The solid arrows within the motors illustrate a mode or direction of operation when pressure fluid is being delivered to them from the supply system, not shown, at point 3. The broken line arrows within the motors illustrate the direction of rotation of the motors when fluid under pressure is provided at point 4 and discharged at point 3.

If it is assumed the overall pressure drop across both motors is P then the pressure at point 5, which is disposed between the two motors, has a value $P/2$. Each of the motors is provided with a leakage oil drain 6, 7 respectively.

An equalizing system in accordance with the invention is illustrated at 8 and comprises a casing or housing 9 within which are disposed valving means comprising two opposed pistons 10, 11. The piston 11 has twice the cross sectional area of the piston 10 so that a cross section area ratio of 1:2 exists. Within the casing 9 are formed two cylinders or chambers of different diameters within which the two pistons are housed for reciprocable operation therein. A cylinder in which the smaller piston 10 is housed has a space 12 in communication with a line 13 which is a feed pressure line communicating with the supply point 3. A space or chamber 14 between the two cylinders is in communication with a hydraulic discharge line 15 for both modes or directions of operation of the motors. An end space 16 of the cylinder in which the piston 11 is housed is in communication with a line 17 connected to mid-point 5 between the two motors.

A bypass passageway 18 having an orifice 19 opened and closed by the piston 10 is provided for connecting and disconnecting the two cylinder spaces 12, 16. A second bypass duct or passageway 20 is provided with an orifice 21 opened and closed by a leading end of the piston 11 for connecting and disconnecting the space 16 with the space 14 or with the outlet or discharge line 15.

In order to provide for automatic connection of the line 13 with the high pressure side of the system and the line 15 with the low pressure side of the system regardless of mode of operation the system is provided with four non-return valves 22–25. Two of the return valves 22, 24 are connected to permit flow of pressure fluid from either point 3 or point 4 to the pressure supply line 13. Two other return valves 23, 25 are connected on either side of the discharge line 15 controlling discharge flow in the direction of point 3 or point 4 in dependence upon which direction or mode of operation is carried out.

The equalizing system is shown in a balanced condition in FIG. 1 illustrating both paired, series motors 1, 2 operating at uniform speeds and the same torque output i.e. with the pressure at point 5 as $P/2$. When the motors are operating in this manner the valve system 9 assumes the position in which the two bypass passageways 18, 20 are blocked or closed off. An unbalanced condition may result in different ways. For example, if motor 1 operates with a higher leakage than motor 2 the amount of pressure fluid reaching the motor 2 will be insufficient to maintain the required speed for this motor. Moreover, as a consequence pressure at point 5 drops below $P/2$. Thus the pressure acting on piston 10 overcomes the pressure in space 16 so that the piston 10 travels toward the right in the drawing uncovering the passageway 18 and allowing pressure fluid to be bypassed from point 3 to point 5. The bypass 18, therefore, allows additional fluid flow to point 5 which bypasses the motor 1. The same mode of operation applies when the pressure drop across a motor changes for any reason whatsoever. Thus the same consideration applies when there is no leakage through lines 6 and 7 but oil in a motor passes from the high pressure side to the low pressure side within a motor without doing work.

It can be seen that if motor 1 is forced to operate slowly due to an external load or operating conditions the pressure drop between points 3 and 5 will be greater than between points 5 and 4. As a result the system will bypass sufficient additional fluid through the bypass passageway 18 for the pressure drop across both motors to be equalized and approach the condition $P/2$. At the same time the throttle resistance of the passageway 18 prevents the speed difference between the two motors from exceeding a predetermined value.

Figure 2:
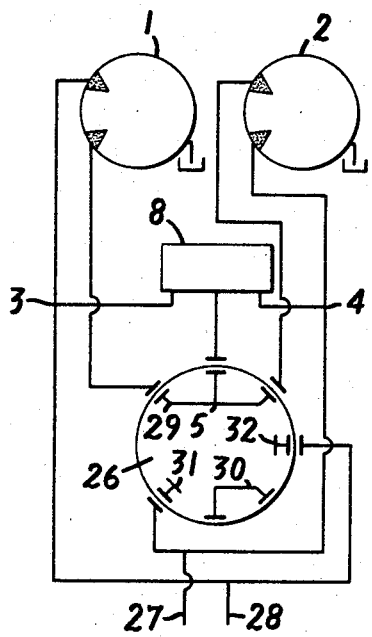
FIG. 2 is a schematic diagram of a hydraulic motor arrangement provided with an equalizing system in accordance with the invention and a change-over switch for series and parallel operation.
Figure 3:
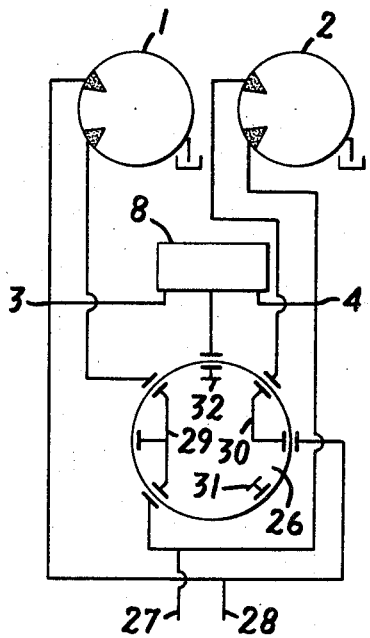
FIG. 3 is a schematic diagram of the apparatus shown in FIG. 2 in a different mode of operation.

The invention provides for use of the pressure equalizing system in a motor arrangement in which the motors can be operated in series or in parallel. FIGURES 2 and 3 illustrate motor arrangements in which the reference numerals correspond to those of FIG. 1 when applied to similar components. As illustrated, motors 1, 2 are connected to a pressure equalizing system 8 shown diagrammatically in block form. The two motors have connected thereto a change-over switch or valve means 26. The switch 26 has connected thereto, and to points 3 and 4, fluid lines 27, 28 functioning as pressure supply and discharge or return lines in dependence upon whether the motors are operated in series mode of operation or parallel mode as illustrated in FIGS. 2 and 3 respectively. With the change-over valve means 26 in the position illustrated in FIG. 2 the motors are in series and run or operate twice as fast and with half the torque as when operated in parallel as shown in FIG. 3. The equalizing system 8 functions as before described.

The change-over switch 26 is provided with passageways 29, 30 and terminal passages 31, 32. In the position illustrated in FIG. 2 connection duct or passageway 29 aligns connections between the motors in which fluid is in series through the motors and the intermediate pressure point 5 is at the point in the switch designated 5. The passageway 30 is ineffective and the terminal passageways 31, 32 terminate connections of the lines 27, 28 to the change-over switch 26. In this mode of operation the fluid under pressure can be applied either through line 27 or line 28 from a pressure source, not shown, or returned in dependence upon whether the motors 1, 2 are rotating in a given or an opposite direction corresponding to the directions of rotation described in FIG. 1.

When the change-over switch is operated to the position shown in FIG. 3 it can readily be seen that the motors 1, 2 are connected through the switch with the lines 27, 28 connected through passageways 29, 30 of the valve so that the motors are in a parallel mode of operation. In this instance the terminal passageway 32 blocks off the central connection to the equalizing system, however, the equalizing system 8 remains connected to points 3 and 4 in which case the operation in parallel is not disturbed.

Figure 4:
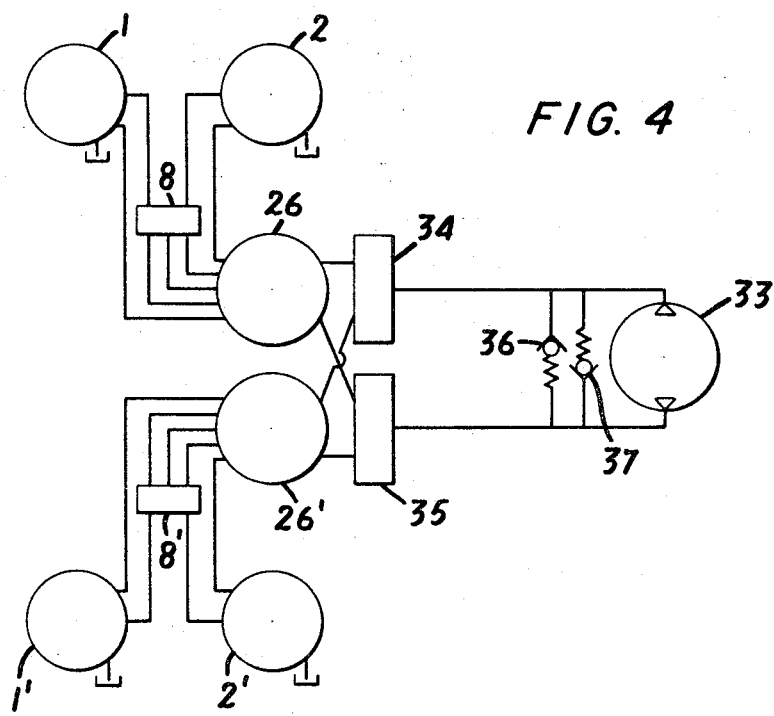
FIG. 4 is a schematic diagram of a motor arrangement for a four wheel vehicle drive from a common pump unit.

The system of the invention makes it possible to use two sets or pairs of hydraulic motors for driving a four wheel drive vehicle. Such an arrangement is diagrammatically illustrated in FIG. 4 in which a first pair of alike hydraulic motors 1, 2 drives two wheels, not shown, and a second pair of alike hydraulic motors 1', 2' drives the other pair of wheels, not shown. The two pairs of wheels are connected to equalizing systems 8, 8' of the type heretofore described and are provided with change-over valves 26, 26' of the type described relative to FIGS. 2 and 3. The motors are supplied from a common pressure source comprising a single, common fluid pump 33 providing hydraulic pressure fluid from a source, not shown and driven by motor means, not shown. In this arrangement two flow distributors 34, 35 insure that the two motor pairs are supplied with the same volume of fluid. The arrangement is provided with pressure relief valves 36, 37. The pairs of motors, change-over valves or switches and the equalizing systems function as before described.

The equalizing system heretofore described is suitable for series motor operation where the hydraulic motors are of different types and which would then revolve at different speeds. In such an arrangement the pressure point 5 is maintained at a pressure corresponding to those conditions.

While preferred embodiments of the invention have been illustrated and shown it will be understood that many changes and modifications may be made within the true spirit and scope of the invention.

What I claim and desire to be secured by Letters Patent is:

1. In combination, paired fluidly connected hydraulic motors, a source of hydraulic fluid under pressure, a pressure equalizing system, connections connecting said system hydraulically to said motors and to said source, pressure-responsive valve means in said system sensing pressure drops across said motors and including means responsive to variations of said pressure drops from selected values and connecting said connections to said system effectively to supply hydraulic fluid to maintain pressure drops across said motors in accordance with said selected values, said valve means comprising two, pressure-operated, opposed, reciprocable pistons, means defining cylinders in which said pistons are reciprocable, means defining a first passageway between said cylinders, said connections including a connection from one of said cylinders to said source, a connection for return of hydraulic fluid from the other of said cylinders and said motors to said source, a connection intermediate paired motors supplying hydraulic fluid from said other cylinder, and said pistons having a diameter ratio effective to cause said pistons to assume a condition in which said passageway is closed by one of said pistons when said selected values obtain and is opened when said variations of said pressure from said selected values obtain, said diameter ratio corresponding to the ratio of the pressure upstream of said motors and a pressure intermediate said motors, non-return valves in said connections automatically connecting said series hydraulic motors to said source for application of pressure fluid initially to either of said paired hydraulic motors, said motors comprising two pairs of motors, and said source comprising a common source of hydraulic pressure fluid, and changeover valve means for operating said motors in pairs in series and alternatively in pairs in parallel.

2. The combination according to claim 1, including flow distributor means to supply equal volumes of fluid to the motors of each pair.

3. The combination according to claim 1, in which said motors are reversible motors.

References Cited

UNITED STATES PATENTS

| | | | |
|---|---|---|---|
| 2,541,292 | 2/1951 | Robinson | 60—53 |
| 2,903,852 | 9/1959 | Bottoms | 60—53 |
| 3,261,421 | 7/1966 | Forster et al. | 60—53 |

EDGAR W. GEOGHEGAN, *Primary Examiner.*

U.S. Cl. X.R.

60—53; 91—412